March 11, 1958  I. W. LICHTENFELS ET AL  2,826,705
VOLTAGE SUPPLY SYSTEM
Filed Nov. 23, 1956
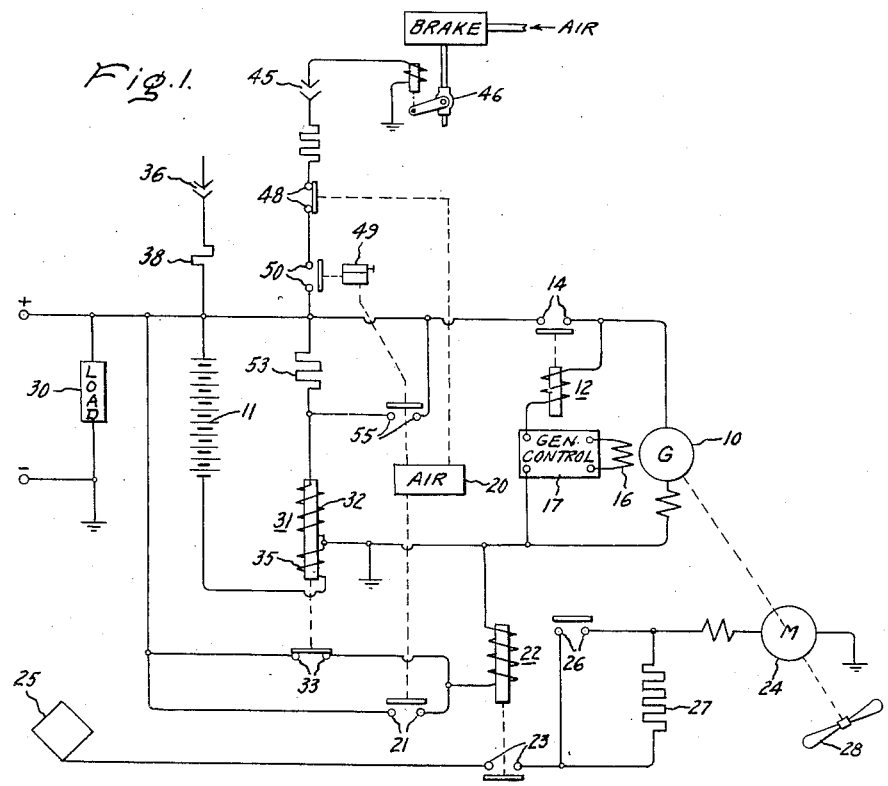
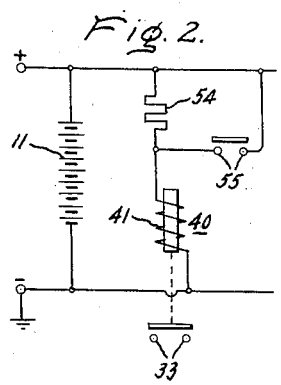
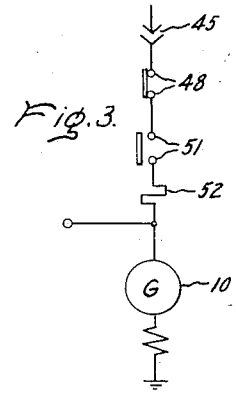
Inventors:
Gay W. Weber,
Ira W. Lichtenfels,
by David P. Ogle
Their Attorney.

United States Patent Office 2,826,705
Patented Mar. 11, 1958

2,826,705

VOLTAGE SUPPLY SYSTEM

Ira W. Lichtenfels, Harborcreek, and Gay W. Weber, Erie, Pa., assignors to General Electric Company, a corporation of New York Application November 23, 1956, Serial No. 623,897

5 Claims. (Cl. 307—9)

Our invention relates to a voltage supply system and, more particularly, to a low voltage supply system for auxiliary equipment of rapid transit rail vehicles.

With rapid transit equipment, it is most economical to run traction motors at a relatively high voltage such as 600 volts direct current. In such equipment, usually a compressor is driven by a 600 volt motor to provide air for the braking system. On the other hand, it is not economical to run auxiliary equipment, marker lights, relays and certain other portions of the equipment from a source of voltage as great as that required for the traction or compressor motors nor is the line voltage constant enough to operate properly calibration equipment, controller motors or indicators. Therefore, for some time constant speed motor generator sets have been opearted on these vehicles to reduce the line voltage to a lower voltage which may be controlled easily and accurately at a voltage such as 40 volts for operating auxiliary equipment. These motor generators have been designated to be most efficient during the operation of the normal load of the vehicle in service.

However, unlike regular locomotive service, rapid transit equipments are all in service during rush peak load hours and most are out of service at other times. During the out of service or "stand-by" periods, it is essentital that each of the vehicle has marker lights energized as well as certain other safety devices. Obviously, when a car is out of service, it is not necessary to provide the maximum power of the motor generator set. Therefore, it has proved most economical to provide a battery for energizing the marker lights and various other equipments of the vehicles when out of service. Also, the batteries are essential to provide control voltage and emergency lighting in the event of power failures which sometime occur. As most of the rapid transit vehicles are out of service over a weekend, a continual drain on the batteries would discharge them resulting in an added effort and expense when returning the train to service. In order to prevent the batteries from being discharged by this continuous drain during long "stand-by" periods, it has been the practice in the industry to provide a resistance connection to the high voltage source which will provide enough current to run the safety equipment and keep the battery charged. These resistors not only increase the initial cost of equipment, losses of the transit system, and add weight to be hauled by the traction motors, but also create special problems such as heating the floors of the vehicles, so that insulation, baffles or other cooling means must be used to prevent customer complaints.

Therefore, an object of our invention is to provide a simple, reliable and inexpensive voltage supply system.

Briefly, in accordance with our invention, in combination with a generator, battery and air brake system, a sensing relay is connected to be normally energized when the battery voltage remains above a predetermined value. During extended "stand-by" periods, the motor generator set circuit is normally open and is closed to charge the battery by the de-energization of the relay. Since several cars of a train are connected during "stand-by," the motor generator set of one car is arranged to trickle-charge all of the batteries of the connected cars. Under such conditions, all of the batteries are electrically connected to increase the total storage of power thus reducing the likelihood of any weak battery causing its motor generator set to start prematurely.

The subject matter which we regard as our invention is particularly pointed out and distinctly claimed in the concluding portion of this specification. Our invention, however, both as to its organization and method of operation together with further objects and advantages thereof, will best be understood by reference to the following description taken in connection with the accompanying drawing, in which:

Fig. 1 is a schematic circuit showing one form of our invention;

Fig. 2 is a schematic circuit showing a modification of our invention; and

Fig. 3 is a schematic circuit showing another modification of our invention.

Referring now to the drawing wherein like numerals designate similar parts, in Fig. 1, we have shown a simplified control circuit for a rapid transit equipment. A generator 10 is provided to supply a direct current to various auxiliary devices including a battery 11, vehicle doors, control devices, any public address system, etc. When the generator 10 is operating, field excitation current passes through and energizes a relay 12 to close a contact 14, and connect the generator 10 to a load circuit including the battery 11.

A field winding 16 of the generator 10 is connected to be energized by a generator voltage control 17 so that during normal operation the generator voltage will be a constant value such as 40 volts. When the vehicle is accelerating, coasting or braking, it is essential that the generator voltage be constant because of the many control devices and calibration relays used to accelerate and stop the train in a predetermined sequence of steps. Therefore, we prefer to maintain generator voltage at a constant value when the vehicle is accelerating or braking.

In service, air pressure from the brake system is supplied to a device 20 which, when actuated thereby, closes the normally open contacts 21 to energize a power connection relay 22 and closes contacts 23 to connect a motor 24 to a 600 volt power supply terminal 25. The contacts 23 of the relay 22 are specially constructed to be able to withstand relatively high voltages and currents. In some applications of our invention, we contemplate making the contacts 21 power contacts, but, usually, it is most economical to utilize the power relay 22.

In order to protect a relatively low current capacity train line 36, contacts 26 may be opened by a controlling means (not shown) to introduce a motor speed reduction means such as a voltage reduction resistor 27 in circuit with the motor 24 to reduce its speed. During "stand-by" operation, reduced speed will limit the power of the generator 10 and will limit automatically the generator current to protect the train line connected thereto. A blower 28 driven by the motor 24 is usually provided to cool any traction motor load resistors, which, of course, are not in use during "stand-by." Also, the reduced speed of the blower 28 will reduce noise and reduce or eliminate the dirt and lint being blown against the cooled equipment. Reduced contamination will materially decrease maintenance costs. One means of controlling blower speed is shown in Letters Patent 2,757,329 issued to I. W. Lichtenfels, July 31, 1956, and assigned to the assignee of the present application.

Also, during stand-by, the normal load of the low voltage system, including the battery 11, is reduced to a minimum including only marker lights and other safety devices shown schematically at 30. Of course, even this limited load will discharge the battery 11. After a relatively extended stand-by period, the discharge of the battery may reduce its voltage as much as 20 percent.

According to our invention, in order to prevent further discharge of the battery 11, a pilot relay 31 is provided with a voltage sensing coil 32 connected in circuit with the battery 11. When the battery voltage is reduced, the relay is de-energized to close a set of contacts 33 which shunt the air pressure operated contacts 21 and energize the relay 22 to start the motor generator set.

When the battery voltage is low and the motor generator set is started by the closing of the pilot relay contacts 33, the controlled voltage of the generator will provide a substantial current for charging the battery 11. Since the generator voltage is usually a constant value slightly greater than the normal battery voltage, the coil 32 will tend to re-energize the relay 31. However, the battery charging current keeps contacts 33 closed by energizing a differential current sensing relay coil 35. The flux produced by the voltage sensing coil 32 is neutralized when the battery charging current is greater than some predetermined value.

Since several of the rapid transit equipments are usually connected together and stored as a train unit, we have, in order to maintain the voltage of all batteries, provided a train line 36 to energize the batteries of the other vehicles from the single motor generator set 10—24. This train line also connects all of the batteries in parallel during the period before any pilot relay is de-energized, whereby no pilot relay will be energized until all of the batteries have been partially discharged. Also, because of the train line 36, once one set of pilot relay contacts 33 have closed, the motor generator will raise the voltage of the entire system so that the pilot relays of the other vehicles will not require their motor generator sets to operate. In order to limit the train wire transient currents to a value which will not damage the train wires or connections, we prefer to connect a low impedance resistor 38 in series with the train line 36.

We have found that with this simplified arrangement, it is practical in some applications to eliminate the differential coil 35 and use a simple relay 40 (Fig. 2) having a single coil 41 which when de-energized will allow the closing of the contacts 33. With the simplified relay 40, the dropout or de-energization voltage is calibrated. However, it is not necessary to calibrate the relay 40 to energize when the current reaches a predetermined minimum. In such equipments, the gap in the relay is made large enough to prevent its re-energization during stand-by operation whereby the motor generator set is run steadily until the train is operated and again stopped.

Because of the fact that the safety of the passengers is of primary importance, it is necessary to provide a means for stopping the train quickly with a minimum of damage. It has been found that simply venting the air brake system from a single valve, although it will stop the train, will stop individual cars at different times. Such a stopping procedure may result in certain of the vehicles remaining in power connections while others have their brakes applied. Thus, damaging stresses may occur in the couplings. This has resulted in the practice of "dumping" or venting the air from all units simultaneously, which is done by energizing a train line 45 to open magnetically valves 46 in all units. However, it is essential that the train line 45 is not energized when it is desired to start the train, because statutes and other regulations require that air pressure be available to stop the train before it may be started. Interlocking connections (not shown) prevent operation of the equipment before air pressure is again available.

In the past, it has been the practice to energize the train line 45 directly from one terminal of the generator 10. Since the loss of air pressure stops the motor generator set 10—24 by the opening of the contacts 21, the train line 45 would be energized only as long as the motor generator set is rotating. However, when it is desired to operate the generator to charge the battery, the train line 45 must be insulated from the power source.

In order to de-energize the train line 45 according to our invention, after contacts 48 are closed by the de-energization of the device 20, we have provided a time delay device 49, which opens contacts 50 a few seconds after the contacts 48 are closed. The amount of time delay is not critical as long as the air has time to drain completely from the valves 46 and the contacts 50 are opened before it is desired to start the train.

In Fig. 3, we have shown the generator 10 connected directly to the train line 45 by the closing of the contacts 48. It is apparent that this connection will utilize the inertia of the rotating equipment as the means of providing the time delay. In order to disconnect the line 45 from the generator 10 when the pilot relays 31 or 40 are de-energized, we have connected contacts 51 in series with the air opened contacts 48. The contacts 51 may be operated directly by the calibrated pilot relay or by the power relay 22.

In order to prevent transient currents from flowing between generators of several vehicles when the contacts 48 are closed, we have connected a low impedance resistor 52 in series with the contacts 48 and 51. We prefer that the resistor 52 have an impedance of about 2 ohms which is sufficient to prevent damaging currents in the train line even if one generator is shut down before another operating at full speed is placed on the line. However, this impedance is insufficient to prevent the operation of the valves 46 from any one generator voltage supply.

We have found that it is desirable to insure re-energization of the relay 31 or the relay 40 when the train is again operated. In order to do this, the calibration resistors 53 (Fig. 1) or 54 (Fig. 2) are shunted from the circuit by the contacts 55 when air pressure is re-applied to the device 20. It should be noted that with this arrangement, the air contacts 21 and 55 close before the relay contacts 33 open. The air contacts 48 open before relay contacts 51 (Fig. 3) are reclosed. Also, it is preferable that the air device 20 re-close the contacts 50 (Fig. 1) after contacts 48 are opened. With such sequential operation, it is a simple matter to recharge the air system without re-energizing the train line 45.

Because of the sensitive calibration of the relays 31 and 40, we prefer that the currents in the contacts 33 are control currents of a magnitude which will not damage the connections or weld them shut. In many modifications of our invention, this reason alone is sufficient to justify the operation of contacts 23 and 51 from the power relay 22.

While we have shown and described one embodiment of our invention, other modifications will occur to those skilled in the art. We desire it to be understood, therefore, that we intend the appended claims to cover all such modifications within the true spirit and scope of our invention.

What we claim as new and desire to secure by Letters Patent of the United States is:

1. A voltage supply system comprising a generator, a battery connectable in circuit with said generator to be charged thereby, a motor drivingly connected to said generator, a pilot relay arranged to be energized by said battery as long as the voltage across said battery is greater than a predetermined value, said relay adapted when de-energized to connect said motor to a power source, an air pressure device, and means operable by said air pressure device for connecting said motor to said power source when air is supplied to said device whereby a reduction of pressure in said air pressure device will open the power circuit of said motor and allow said pilot relay to be de-energized at said voltage.

2. A voltage supply system for a vehicle comprising a generator adapted to supply power to auxiliary equipment, a battery adapted to supply power to standby lights and emergency equipment connectable in circuit with said generator to be charged thereby, a motor drivingly connected to said generator, a pilot relay connected to be energized thereby as long as the voltage across said battery is greater than a predetermined value, said relay adapted when de-energized to connect said motor to a power source, an air brake system operable to stop and hold the vehicle when the air pressure is vented, a normally closed valve means adapted to be opened to vent said air brake system, an air pressure device, first means operable by said air pressure device for recalibrating said relay to insure its energization when air is supplied to said device, a second means operable by said device for energizing said valve means to vent said air pressure, time delay means for de-energizing said valve means after said air brake system is vented and third means operable by said air pressure device for connecting said motor in circuit with said power source when said air is supplied to said device whereby the loss of air pressure will disconnect said motor from said source and calibrate said pilot relay to be de-energized at said voltage thereby to re-energize said motor for driving said generator to charge said battery.

3. A voltage supply system for a vehicle comprising a generator adapted to supply power to auxiliary equipment, a motor drivingly connected to said generator, a battery adapted to supply power to standby lights and emergency equipment connectable in circuit with said generator to be charged thereby, a pilot relay having a first coil connected in circuit with said battery and calibrated to be energized thereby as long as the voltage across said battery is greater than a predetermined value, a second coil of said relay connected in series with said battery and adapted to prevent reenergization of said relay until any charging current is less than a predetermined value, a contact of said relay adapted to be closed when said relay is de-energized for connecting said motor to a power source, an air brake system operable to stop and hold the vehicle when the air pressure is vented, electric circuit means adapted to vent said air brake system, an air pressure device, first means operable by said air pressure device for recalibrating said relay to insure its energization when air is supplied to said device, a second means operable by said device for energizing said electric circuit means to vent said air pressure, third means operable by said air pressure device for disconnecting said motor from said power source when said air is vented from said device whereby the stopping of said generator to remove the power from said electric circuit means and the inertia of said motor and said generator will act as a time delay means to allow completion of the venting of said air brake system and the loss of air pressure will open the power circuit of said motor and calibrate said pilot relay to be de-energized at said voltage thereby to re-energize said motor for driving said generator to charge said battery, and another means operable by said pilot relay adapted when said relay is de-energized to prevent re-energization of said electric circuit means.

4. A voltage supply system for a vehicle comprising a generator adapted to supply power to auxiliary equipment, a motor drivingly connected to said generator, a battery adapted to supply power to standby lights and emergency equipment connectable in circuit with said generator to be charged thereby, a pilot relay connected in circuit with said battery and calibrated to be energized thereby as long as the voltage across said battery is greater than a predetermined value, a contact of said relay adapted to be closed when said relay is de-energized for connecting said motor to a power source, an air brake system operable to stop and hold the vehicle when the air pressure is vented, an air pressure device, first means operable by said device for energizing means to vent said air pressure, and second means operable by said air pressure device for connecting said motor in circuit with said power source when said air is supplied to said device whereby the loss of air pressure will open the power circuit of said motor and apply the brakes, thereafter allowing said pilot relay to be de-energized at said voltage to re-energize said motor for driving said generator to recharge said battery.

5. A voltage supply system for a rail vehicle controllable from train lines comprising, a generator, a battery connectable in circuit with said generator to be charged thereby, a motor drivingly connected to said generator, a pilot relay arranged to be energized by said battery as long as the voltage across said battery is greater than a predetermined value, said relay adapted when de-energized to close a switch means to connect said motor to a power source, an air pressure device, a first switch contactor operable by said air pressure device for connecting said motor to said power source when air is supplied to said device whereby a reduction of pressure in said air pressure device will open the power circuit of said motor and allow said pilot relay to be de-energized at said voltage, an air brake system operable to retard and hold the vehicle when air pressure is vented, an air valve operable when power is supplied to a train line for venting said air brake system, a second switch contactor operable by said air pressure device for connecting said generator to said train line, a resistor connected in circuit with said second switch for inhibiting excessive transient current flow between said train line and said generator, and another switch means operable by de-energization of said pilot relay to open the circuit between said generator and said train line to prevent energization of said air valve when said generator is charging said battery in stand-by.

No references cited.